UNITED STATES PATENT OFFICE.

JOSEPH WEISMAN, OF PHILADELPHIA, PENNSYLVANIA.

IMPROVED COMPOSITION FOR COATING METAL.

Specification forming part of Letters Patent No. 43,444, dated July 5, 1864.

*To all whom it may concern:*

Be it known that I, JOSEPH WEISMAN, of Philadelphia, in the State of Pennsylvania, have invented or discovered a new pigment designed for coating leaden or iron vessels, tanks, and tubes, metallic roofs, and any other metallic surfaces, to prevent oxidation or corrosion. When applied to telegraph-wires, it not only prevents these results, but also secures insulation of the electric current. I hereby declare the following to be a full and exact description of my said invention.

The basis of my pigment is graphite, preferring that which is of a great specific gravity, that obtained from the micaceous schist formation in North Carolina being particularly adapted to that purpose. It should also be used as soon as practicable after having been taken from the mine, as it then works much more kindly than after it has been exposed to the atmosphere for any length of time.

I place the graphite in a water-vat, where it is ground and agitated, in order that the finer particles may be made to float in the fluid, while the large and heavy particles and most of the impurities sink to the bottom. In this way a sort of scum solution is effected of the graphite. When the water becomes, as it were, saturated in this manner—that is to say, when it is made to hold in suspension as large a portion of this finely-divided graphite as is practicable—it is drawn off into another vessel, where the water is evaporated. The graphite is obtained in a dry state as fine as it can be separated by merely mechanical means. This pulverized graphite is then mixed with some of the drying-oils and boiled for three or four hours, when it is fit for use. The proportion between the oil and the graphite should be such that the compound should be of the right consistency to be used with a brush, though the exact proportion is not essential. For oil I prefer the mixture of about one-fourth cotton-seed oil with three-fourths linseed-oil; but this is not essential. The use of gum-shellac in smaller or larger quantities, according to the use to be made of the pigment, facilitates its drying and adds to its value.

Having thus described my invention, what I claim as new, and desire to secure by Letters Patent, is—

The new manufacture or composition of matter, prepared substantially as hereinbefore set forth.

JOSEPH WEISMAN.

Witnesses:
    R. T. CAMPBELL,
    E. SCHAFER.